United States Patent
Huang et al.

(10) Patent No.: US 8,996,783 B2
(45) Date of Patent: Mar. 31, 2015

(54) MANAGING NODES IN A STORAGE SYSTEM

(75) Inventors: Hueichian Huang, Saratoga, CA (US); Srinivasa D Murthy, Cupertino, CA (US); Siamak Nazari, Mountain View, CA (US); Roopesh Kumar Tamma, San Ramon, CA (US); Jianding Luo, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 531 days.

(21) Appl. No.: 13/459,240

(22) Filed: Apr. 29, 2012

(65) Prior Publication Data
US 2013/0290642 A1 Oct. 31, 2013

(51) Int. Cl.
*G06F 12/00* (2006.01)
*G06F 21/00* (2013.01)
*G06F 3/06* (2006.01)

(52) U.S. Cl.
CPC .............. *G06F 3/067* (2013.01); *G06F 3/0617* (2013.01); *G06F 3/0631* (2013.01); *G06F 3/0665* (2013.01)
USPC .............................................. 711/6; 711/165

(58) Field of Classification Search
CPC ................... G06F 3/0689; G06F 3/067; G06F 2003/0697; G06F 3/0617; G06F 3/0665
USPC ........................................................ 711/6, 165
See application file for complete search history.

(56) References Cited

U.S. PATENT DOCUMENTS

| | | | |
|---|---|---|---|
| 6,078,990 A | 6/2000 | Frazier | |
| 6,711,632 B1 | 3/2004 | Chow et al. | |
| 6,904,599 B1 | 6/2005 | Cabrera et al. | |
| 7,032,093 B1 * | 4/2006 | Cameron | 711/170 |
| 7,047,287 B2 | 5/2006 | Sim et al. | |
| 7,908,445 B2 | 3/2011 | Schnapp et al. | |
| 2006/0259687 A1 * | 11/2006 | Thomas et al. | 711/114 |
| 2011/0225359 A1 | 9/2011 | Kulkarni et al. | |

* cited by examiner

*Primary Examiner* — Charles Rones
*Assistant Examiner* — Sidney Li
(74) *Attorney, Agent, or Firm* — Patent Law Group LLP

(57) ABSTRACT

Each node in a clustered array is the owner of a set of zero logical disks (LDs). Thinly-provisioned VVs (TPVVs) are partitioned so each is mapped to a group of zero LDs from different sets of zero LDs. When there is a change in ownership, the affected zero LDs are switched one at a time so only a group of the TPVVs is affected each time.

15 Claims, 7 Drawing Sheets

|  | Set 0 | Set 1 | | Set 7 |
|---|---|---|---|---|
| Group 0 | ZLD(0, 1)0 | ZLD(1, 0)0 | . . . | ZLD(7, 6)0 |
| Group 1 | ZLD(0, 1)1 | ZLD(1, 0)1 | . . . | ZLD(7, 6)1 |
| ⋮ | | | | |
| Group 15 | ZLD(0, 1)15 | ZLD(1, 0)15 | . . . | ZLD(7, 6)15 |

FIG. 5

MANAGING NODES IN A STORAGE SYSTEM

BACKGROUND

In a clustered storage array there are various situations that require changes in ownership of virtual volume (VV) regions between nodes in the cluster. These situations include a node joining or rejoining the cluster as well as reorganizing the layout of a virtual volume that changes the ownership of the VV regions.

BRIEF DESCRIPTION OF THE DRAWINGS

In the drawings:

FIG. 5 is a block diagram illustrating multiple groups of zero LDs in one example of the present disclosure;

Use of the same reference numbers in different figures indicates similar or identical elements.

DETAILED DESCRIPTION

The process of changing ownership of virtual volume (VV) regions between nodes in a storage system (e.g., a clustered storage array) may slow host access because the IOs to all VVs are suspended while an old owner flushes metadata and logs from cache to a backing store. The IOs to all the VVs are suspended because the metadata and logs are grouped in such a way that all VVs are affected at the same time.

Examples of the present disclosure decrease the disruption to host IOs during a change in ownership by increasing the number of zero logical disk (LD) regions and spreading the data (e.g., metadata and logs) for thinly-provisioned VVs (TPVVs) across them. Instead of each node owning just one zero LD, each node is the owner of a set of zero LDs. The TPVVs are partitioned so each is mapped to a group of zero LDs from different sets of zero LDs. When there is a change in ownership, the affected zero LDs are switched one at a time so only one group of all the TPVVs is affected each time. This reduces the amount of data that needs to be flushed or copied across nodes, thereby reducing the IO disruption seen by hosts.

Figure 1:
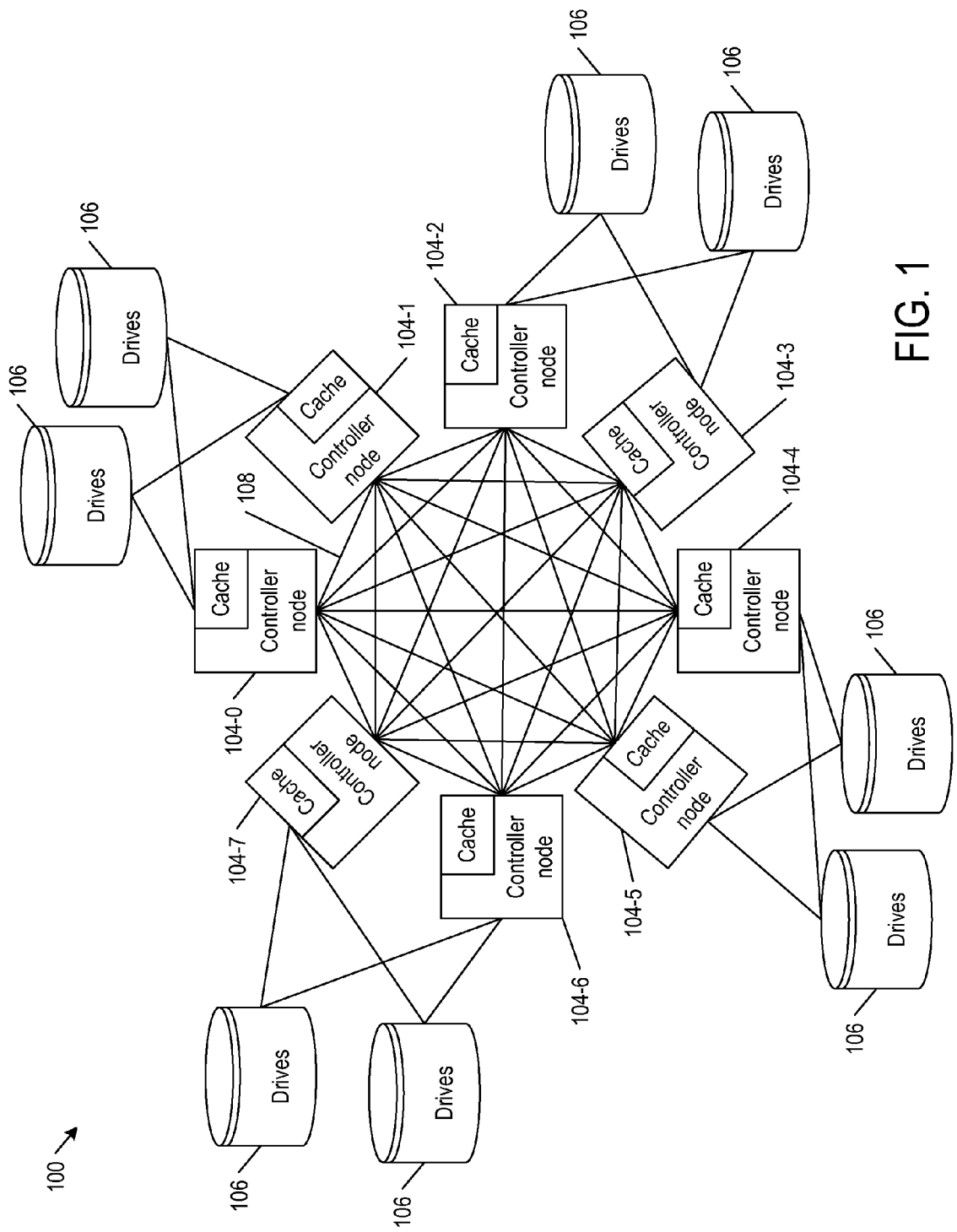
FIG. 1 is a block diagram of a storage system in one example of the present disclosure.

FIG. 1 is a block diagram of a storage system 100 in one example of the present disclosure. Host computers are coupled to access virtual volumes (VVs) provisioned by storage system 100. In one example, storage system 100 includes controller nodes 104-0, 104-1 . . . 104-7. Although eight controller nodes are shown, a less or greater number of controller nodes may be used. Each controller node may be connected to host computers 102 and physical disk drives 106. Controller nodes 104-0 to 104-7 are interconnected by a backplane 108. For clustering and redundancy, controller nodes 104-0 and 104-1 are paired, controller nodes 104-2 and 140-3 are paired . . . controller nodes 104-6 and 104-7 are paired.

Software on controller nodes 104-0 to 104-7 virtualizes the storage space in physical disk drives 106 as VVs and provides the VVs as virtual logical unit numbers (LUNs) to host computers 102. In one example, physical disk drives 106 are broken into "chunklets" of a uniform size. The chunklets are organized into one or more logical disks with the desired RAID type, the desired layout characteristics, and the desired performance characteristics. All or portions of a logical disk (LD) or multiple LDs are organized into a VV. Soft copies of the VV to LD mapping are saved in the random access memories (RAMs) of all the controller nodes. Soft copies of the LD to chunklet mapping are saved in the RAMs of the controller nodes for the node pair providing the primary and backup data service for each particular logical disk. Hard copies of the VV to LD to chunklet mapping are saved in a table of content (TOC) on each physical disk drive or in one physical disk drive per drive magazine in storage system 100.

Figure 2:
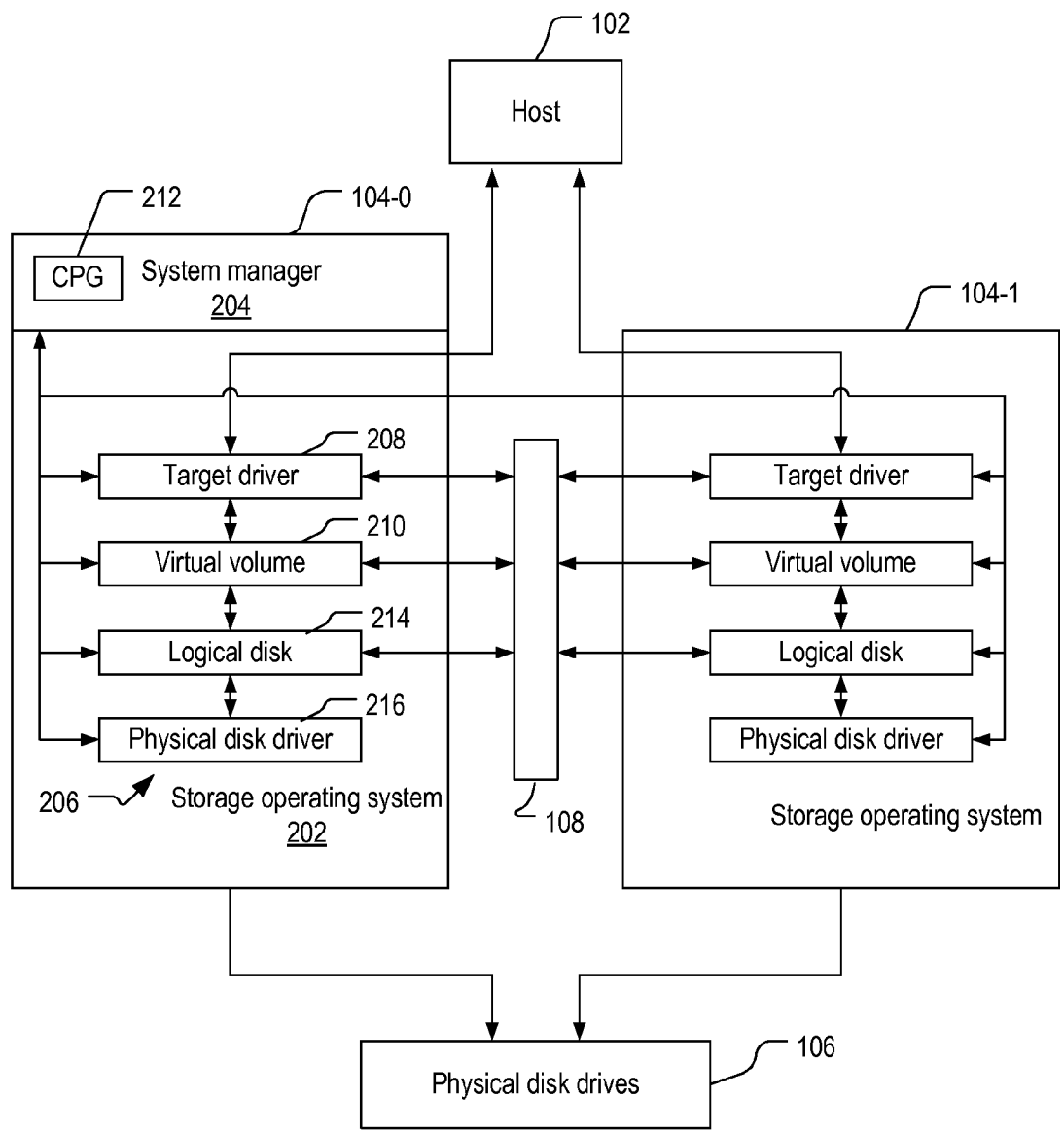
FIG. 2 is a block diagram illustrating the software architecture of a node pair in one example of the present disclosure.

FIG. 2 is a block diagram illustrating the software architecture of node pair 104-0 and 104-1 in one example of the present disclosure. Other node pairs are similarly implemented. Controller node 104-0 executes an operating system 202 and a system manager 204 residing above the operating system. Operating system 202 has a data stack 206 consisting of a target driver 208, a VV layer 210, a LD layer 214, and a physical disk driver 216. Operating system 202 presents VVs or partitions of VVs to host computers 102.

Physical disk driver 216 organizes physical disk drives 106 into a pool of chunklets. In one example, each chunklet is 256 megabytes of contiguous disk space. Although physical disk drives are disclosed, physical disk driver 216 can organize other physical storage devices into a pool of physical storage regions.

LD layer 214 organizes the chunklets into LD regions, and LD regions into LDs based on the RAID type, drive type, radial placement, and stripe width to achieve the desired cost, capacity, performance, and availability characteristics. In one example, an LD region is 256 megabytes of LD storage space.

VV layer 210-1 divides up each LD region into pages for storing information (address tables and data). In one example, a page has a size of 16 kilobytes and holds thirty-two 512 byte data blocks. VV layer 210 maps a logical block in a VV ("VV block") to a block in a page of a LD region ("LD block").

A common provisioning group (CPG) manager 212 in system manager 204 allocates LDs to VVs on an as-needed basis. CPG manager 212 allows the user to create a CPG with one or more LDs that provide a buffer pool of free LD regions. CPG manager 212 also allows the user to create common-provisioned VVs (CPVVs), which are fully provisioned, and thinly-provisioned VVs (TPVV) from LD regions in the buffer pool. When a CPVV is creates, all of its exported capacity is mapped to LD regions. When a TPVV is created, only a fraction of its exported capacity is mapped to LD regions. As application writes deplete the mapped LD regions to the TPVV, CPG manager 212 assigns additional LD regions from the LD region buffer pool to the TPVV. Over time, as the LD region buffer pool runs low, CPG 212 creates additional LDs to replenish LD regions in the buffer pool.

Target driver 208 communicates VV read/write requests from host computers 102 to VV layer 210. In one example, the read/write requests follow the SCSI protocol. Although not shown, operating system 202 may provide higher level network data services including NFS, CIFS, and HTTP to allow file system export over native TCP/IP network services.

Similarly, controller node 104-1 executes an operating system with a CPG and a data stack having a target driver, a VV layer, a LD layer, and a physical disk driver. Components of the data stacks communicate by backplane 108. Other node pairs are similarly implemented as node pair 104-0 and 104-1.

System manager 204 resides only on one of the controller nodes of data storage system 100. System manager 204 keeps a single system image of storage system 100. System manager 204 also services events from the data stacks, delivers configuration commands to the data stacks, and records system configuration information, including the physical disk to logical disk to virtual volume mapping, on one or more physical disk drives.

Figure 3:
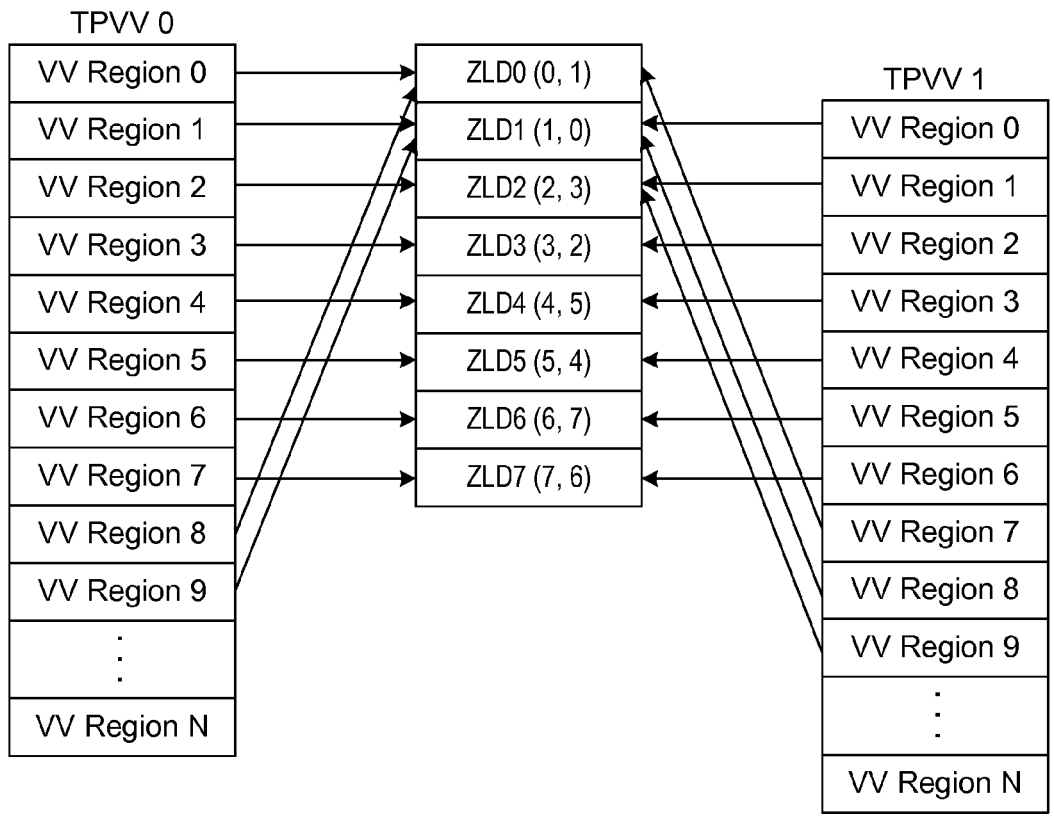
FIG. 3 is a block diagram illustrating the mapping of thinly-provisioned virtual volumes (TPVVs) to a common set of zero logical disk (LD) regions in one example of the present disclosure.

FIG. 3 is a block diagram illustrating the mapping of TPVV 0 and TPVV 1 to a common set of zero LDs in one example of the present disclosure. In one example, each TPVV is created as an exception list with VV region 0, VV region 1 . . . VV region N (where N is a variable) mapped to zero LDs ZLD0, ZLD 1 . . . ZLD 7. TPVV 0 and TPVV 1 may have different sizes. TPVV 0 and TPVV 1 may also have different starting offset for their mappings to the common set of zero LDs.

The common set of zero LDs is a data structure that represents node ownership of host data. Each zero LD is associated with a unique pair of a primary node and a backup node that determines ownership striping of host data. Each zero LD follows the naming convention of "(primary node, backup node)". In one example, zero LD ZLD0 is associated with node pair (0, 1) where node 0 is the primary node and node 1 is the backup node, zero LD ZLD1 is associated with node pair (1, 0) where node 1 is the primary node and node 0 is the backup node, . . . zero LD ZLD7 is associated with node pair (7, 6) where node 7 is the primary node and node 6 is the backup node. When a host writes to VV regions, VV layer 210 maps the VV regions to the corresponding zero LDs and then passes the host data to the primary nodes that owns the zero LDs. When the primary node is offline for whatever reason, system manager 204 updates the node pair to promote the backup node to the primary role so VV layer 210 passes the host data to the new owner.

Figure 4:
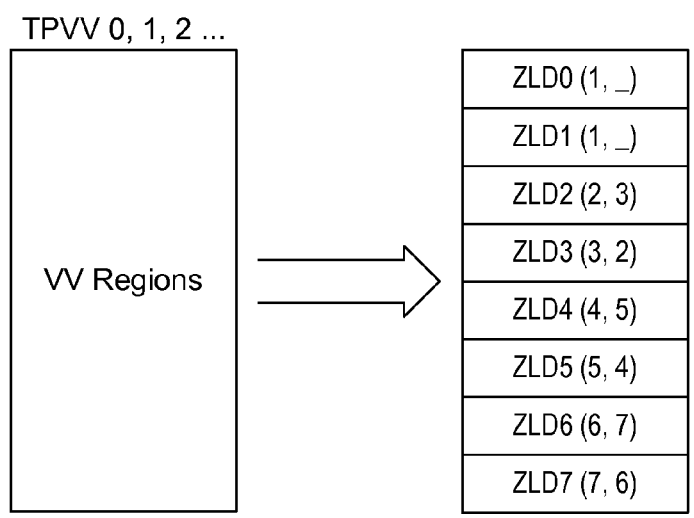
FIG. 4 is a block diagram illustrating the mapping of FIG. 3 when a node is offline in one example of the present disclosure.

FIG. 4 is a block diagram illustrating the mapping of FIG. 3 when a node is offline in one example of the present disclosure. In one example, node 0 is offline so the node pair for zero LD ZLD0 becomes (1, -). This indicates node 1 has taken over the tasks of storing host data for node 0. Note that "-" indicates there node 1 does not have a backup. When node 0 returns to retake ownership of zero LD ZLD0, the metadata and logs in node 1 have to be flushed from cache to backing store to ensure data consistency. As node 1 is flushing data, all the TVPPs must cease IOs as they all have VV regions mapped to LD ZLD0 that was previously located on node 1. Flushing data may take a long time and result in delays in host IO service time. The same situation occurs when a new node is added or if ownership is changed to reorganize the layout of a VV. To address this situation, the number of zero LDs is increased to spread the metadata and logs across the VVs.

FIG. 5 is a block diagram illustrating multiple groups of zero LDs in one example of the present disclosure. Each node is the owner of a set of zero LDs. In one example, node 0 is the owner of a set of zero LDs ZLD(0, 1)0, ZLD(0, 1)1 . . . ZLD(0, 1)15, node 1 is the owner of a set of zero LDs ZLD(1, 0)0, ZLD(1, 0)1 . . . ZLD(1, 0)15, . . . and node 7 is the owner of a set of zero LDs ZLD(7, 6)0, ZLD(7, 6)1 . . . ZLD(7, 6)15. In another example, a set of zero LDs includes more or less zero LDs.

In one example, system manager 204 creates 16 groups of zero LDs where each group includes zero LDs from different sets of zero LDs. In another example, system manager 204 creates more or less groups of zero LDs. Group 0 includes zero LDs ZLD(0, 1)0, ZLD(1, 0)0 . . . ZLD(7, 6)0, group 1 includes zero LDs ZLD(0, 1)1, ZLD(1, 0)1 . . . ZLD(7, 6)1, . . . and group 15 includes zero LDs ZLD(0, 1)15, ZLD(1, 0)15 . . . ZLD(7, 6)15. The zero LD now follows the naming convention of "(primary, backup) group".

Figure 6:
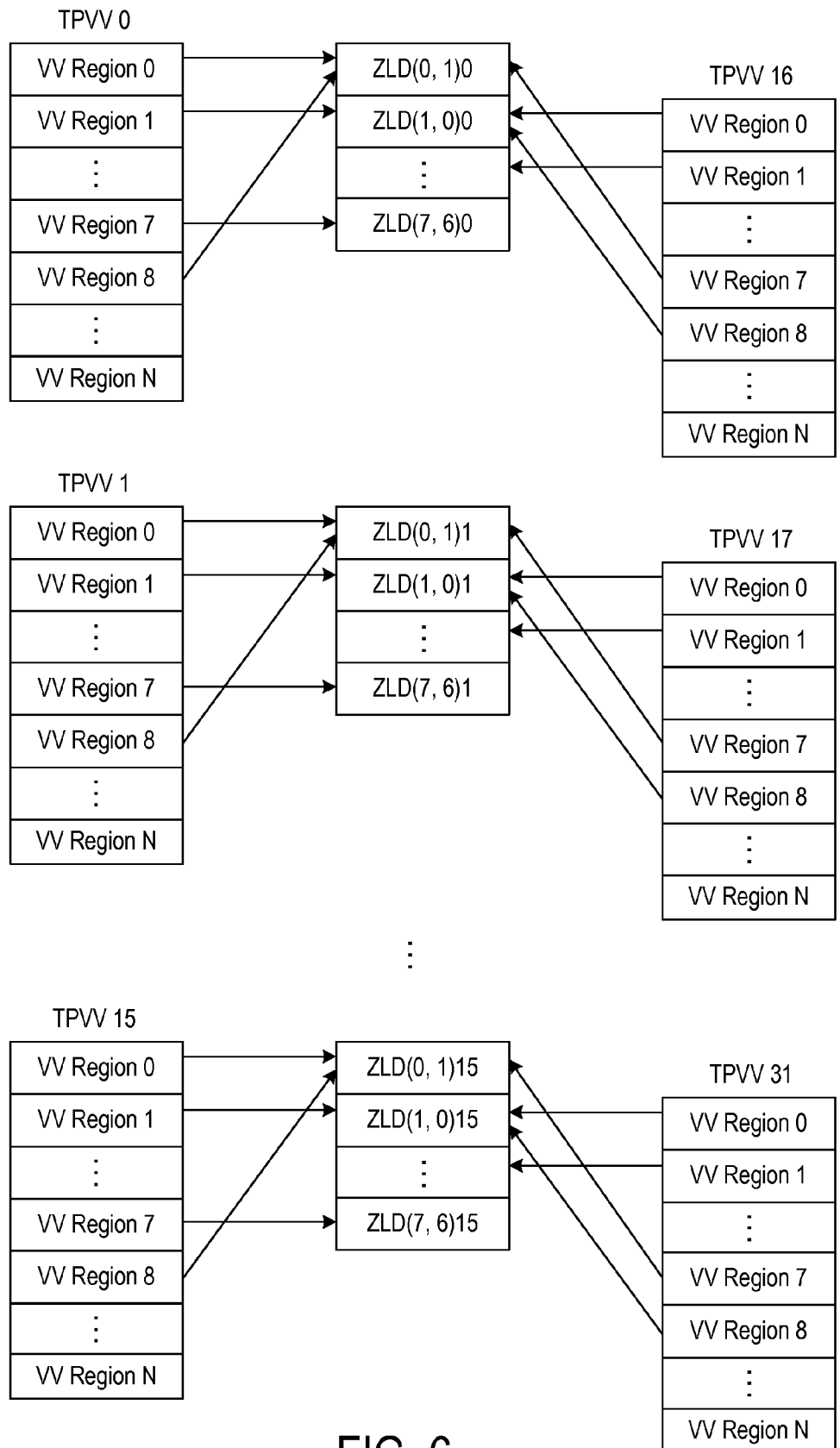
FIG. 6 is a block diagram illustrating the mapping of a number of TVPPs to the multiple sets of zero LDs in one example of the present disclosure.

FIG. 6 is a block diagram illustrating the mapping of a number of TVPPs to the multiple groups of zero LDs in one example of the present disclosure. Different TPVVs are mapped to different groups of zero LDs. In one example, TPVV 0 is mapped to group 0, TPVV 1 is mapped to group 1 . . . TPVV 15 is mapped to group 15. Once the groups are used up, the next TPVV is mapped to the first group again. In one example, TPVV 16 is mapped to group 0, TPVV 17 is mapped to group 1, and so forth.

Figure 7:
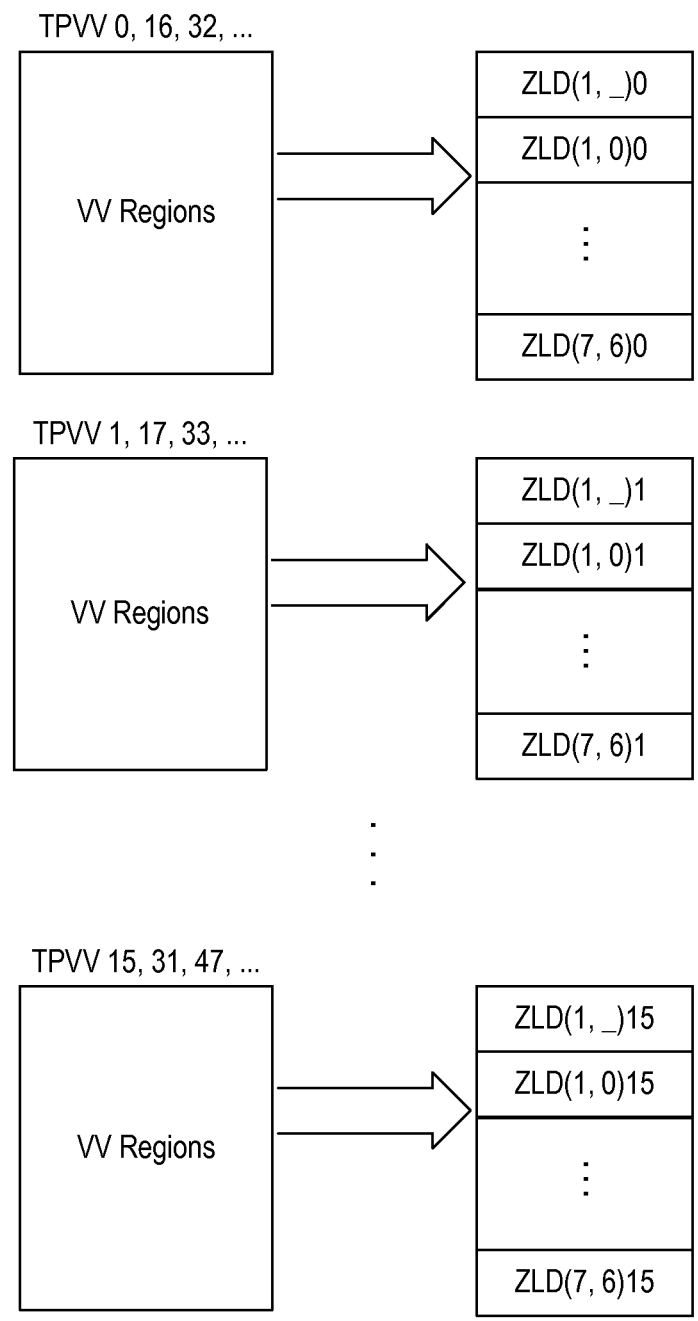
FIG. 7 is a block diagram illustrating the mapping of FIG. 6 when a node is offline in one example of the present disclosure.

FIG. 7 is a block diagram illustrating the mapping of FIG. 6 when a node is offline in one example of the present disclosure. In one example, node 0 is offline so zero LD ZLD(0, 1)0 becomes ZLD(1, -)0, zero LD ZLD(0, 1)1 becomes ZLD(1, -)1, . . . and zero LD ZLD(0, 1)15 becomes ZLD(1, -)15. When node 0 returns to retake ownership, the affected zero LDs ZLD(1, -)0, ZLD(1, -)1 . . . and ZLD(1, -)15 are switched to flush their metadata and logs in node 1. In one example, the affected zero LDs ZLD(1, -)0, ZLD(1, -)1 . . . and ZLD(1, -)15 is switched one at a time. At most 1/16 of the total TPVVs are mapped to one group of zero LDs having one of the affected zero LDs ZLD(1, -)0, ZLD(1, -)1 . . . and ZLD(1, -)15. Therefore at most 1/16 of the total TPVVs are affected each time ownership is changed for one affected zero LD, thereby effectively reducing the disruption to host IOs. In other examples, a greater number of the affected zero LDs ZLD(1, -)0, ZLD(1, -)1 . . . and ZLD(1, -)15 are switched at a time so that a greater percentage of the total TPVVs are affected.

Figure 8:
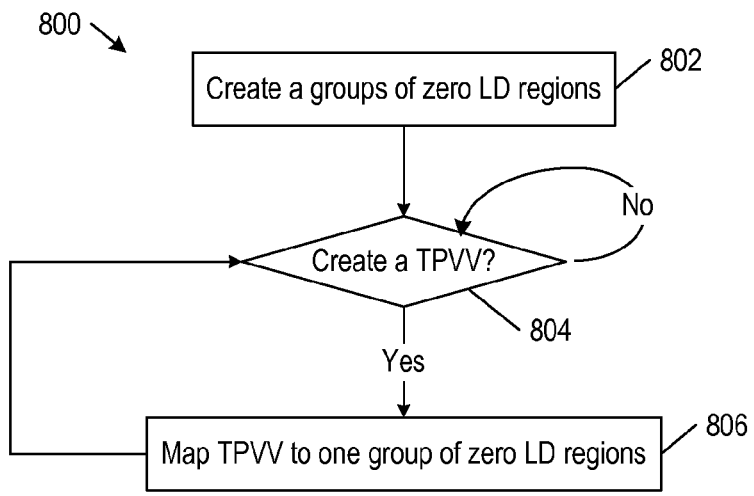
FIG. 8 is a flowchart of a method for mapping TPVVs to multiple groups of zero LDs in one example of the present disclosure.

FIG. 8 is a flowchart of a method 800 for mapping TPVVs to multiple groups of zero LDs in one example of the present disclosure. Method 800 begins in block 802.

In block 802, system manager 204 (FIG. 2) creates the groups of zero LDs from different sets of zero LDs owned by different nodes. Block 802 is followed by block 804.

In block 804, system manager 204 determines if a TPVV is to be created. If so, block 804 is followed by block 806. Otherwise block 804 loops back to itself.

In block 806, system manger 204 maps the TPVV to a group of zero LDs. System manger 204 may record the most recently used group of zero LDs and map the TPVV to a different (e.g., the next one in sequential order) group of zero LDs. As host computers 102 (FIG. 2) write to the TPVV, the host data will be sent to the nodes identified by the zero LDs, which in turn caches the host data and flushes them to backing store when appropriate.

Figure 9:
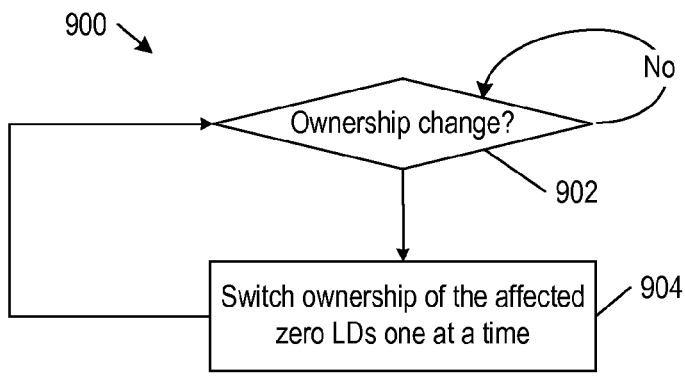
FIG. 9 is a flowchart of a method for switching ownership of the zero LDs in one example of the present disclosure.

FIG. 9 is a flowchart of a method 900 for switching ownership of the zero LDs in one example of the present disclosure. Method 900 begins in block 902.

In block 902, system manger 204 (FIG. 2) determines if there is an ownership change. If so, block 902 is followed by block 904. Otherwise block 902 loops back to itself. As described above, ownership change may come from an old node rejoining the system, a new node joining the system, or a change to the layout of a VV.

In block 904, system manager 204 determines the affected zero LDs and switches their ownership one at a time. In one example, node 0 rejoins the system. System manager 204 then switches ownership of affected zero LDs ZLD(1, -)0, ZLD(1, -)1 . . . ZLD(1, -)15 one at a time. To do so, system manager 204 blocks the TPVVs mapped to the affected zero LDs ZLD(1,-)0, ZLD(1,-)1 . . . ZLD(1,-)15 one at a time and node 1 flushes the meta data and logs associated with the affected zero LDs ZLD(1,-)0, ZLD(1,-)1 . . . ZLD(1,-)15 one at a time. The flushing of meta data and logs may be flagged with a priority bit to expedite the process and further reduce disruption to host IOs. Block 904 is followed by block 902.

To switch ownership of non-zero LDs mapped to CPVVs, the CPGs may be used as a criterion to limit the number of CPVVs involved in an effort to reduce disruption to host IOs. In one example, system manager 204 selects to switch the non-zero LDs allocated from 1/16 of one CPG at a time. In other words, system manager 204 selects one CPG at a time and then selects 1/16 of the non-zero LDs from that CPG that needs ownership switch.

Figure 10:
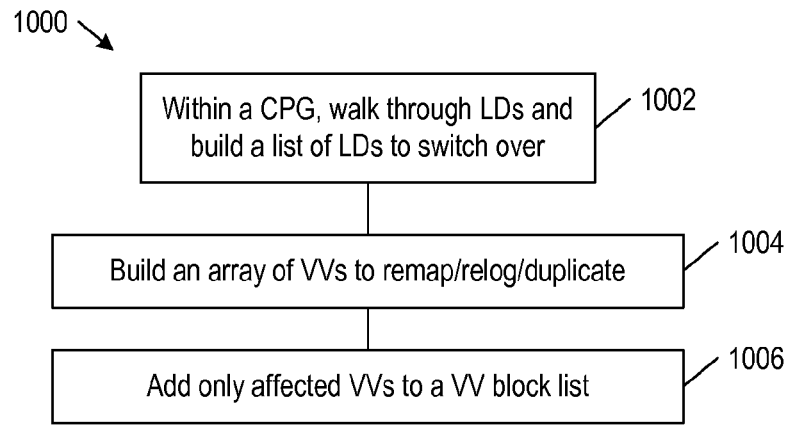
FIG. 10 is a flowchart of a method for switching ownership of non-zero LDs of fully-provisioned virtual volumes in one example of the present disclosure.

FIG. 10 is a flowchart of a method 1000 for switching ownership of non-zero LDs of CPVVs in one example of the present disclosure. Method 1000 substantially follows the principle of method 900. Method 1000 begins in block 1002.

In block 1002, system manager 204 (FIG. 2) walks through the non-zero LDs in a CPG and builds a list of non-zero LDs affected by the change of ownership. Block 1002 is followed by block 1004.

In block 1004, system manger 204 builds a list of the CPVVs that VV layer 210 need to remap, relog, or duplicate. Block 1004 is followed by block 1006.

In block 1006, system manger 204 adds the affected CPVV to a VV block list so host IOs for those CPVV are blocked and the corresponding non-zero LDs can be flushed from cache to backing store.

Customers can change (also called "tune") the layout of a VV to change its underlying RAID and/or cost characteristics. This can result in VV region ownership changes. Just as a node joins or rejoins a cluster, data needs to be flushed or moved out of nodes that lose ownership to nodes that gain ownership. This tuning may use the above examples to reduce IO disruption.

Various other adaptations and combinations of features of the examples disclosed are within the scope of the invention. Numerous examples are encompassed by the following claims.

What is claimed is:

1. A method of managing changes in ownership of virtual volume regions between nodes in a storage system, comprising:
creating zero logical disk (LD) groups, each zero LD group comprising zero LDs from different sets of zero LDs owned by different nodes, each zero LD having a unique pair of a primary node and a backup node;
creating thinly-provisioned virtual volumes (TPVVs) by mapping each TPVV to one zero LD group; and
when a change of ownership occurs, switching ownership of affected zero LDs one at a time so host IO is suspended for one group of the TPVVs at a time.

2. The method of claim 1, wherein each TPVV comprises virtual volume regions mapped to zero LDs in a corresponding zero LD group.

3. The method of claim 1, wherein each TPVV is mapped to a zero LD group different from the most recently used zero LD group.

4. The method of claim 1, wherein each zero LD is associated with a primary node, a backup node, and a group ID.

5. The method of claim 1, wherein switching ownership of the affected zero LDs one at a time comprises:
determining TPVVs mapped to a zero LD group with an affected zero LD;
suspending host IOs the TPVVs mapped to the zero LD group; and
flushing data from cache to backing store for an old primary node.

6. The method of claim 1, further comprising:
when the change of ownership occurs, switching ownership of affected non-zero LDs from one common provisioning group at a time so host IO is suspended for one group of the common-provisioned virtual volumes (CPVVs) at a time, the CPVVs being fully provisioned, the common provisioning group providing a pool of LD regions for creating virtual volumes.

7. The method of claim 6, wherein switching the ownership of the affected non-zero LDs comprises:
determining non-zero LDs having an old primary node;
determining CPVVs mapped to the non-zero LDs having the old primary node;
suspending host IO to the group of the CPVVs mapped to the non-zero LDs having the old primary node; and
flushing data from cache to backing store for the old primary node.

8. The method of claim 1, wherein the change of ownership occurs when a node joins the storage system or when characteristics of a VV is changed.

9. A method of managing nodes in a storage system, comprising:
determining thinly-provisioned virtual volumes (TPVVs) mapped to different zero logical disk (LD) groups, each zero LD group comprising different zero LDs owned by different nodes;
suspending host IOs to a group of TPVVs mapped to one zero LD;
determining non-zero LDs owned by an old primary node;
determining common-provisioned virtual volumes (CPVVs) mapped to the non-zero LDs owned by the old primary node, the CPVVs being fully provisioned;
suspending host IO to the CPVVs mapped to the non-zero LDs owned by the old primary node; and
flushing data from cache to backing store for the old primary node.

10. The method of claim 9, further comprising:
creating the zero LD groups, wherein each zero LD in a zero LD group has a unique pair of a primary node and a backup node;
creating the TPVVs by mapping each TPVV to one zero LD group; and
creating the CPVVs by mapping each CPVV to non-zero LDs from a common provisioning group, the common providing group providing a pool of LD regions for creating virtual volumes.

11. A storage system comprises:
a node comprising:
zero logical disk (LD) groups each comprising zero LDs, the zero LDs having a unique pair of primary and backup nodes within its zero LD group;
thinly-provisioned virtual volumes (TPVVs) each mapped to one zero LD group; and
a system manager to create the zero LD groups, to create the TPVVs, and, when a change of ownership occurs, switch ownership of affected non-zero LDs one at a time so host IO is suspended for one group of the TPVVs at a time.

12. The system of claim 11, wherein the system manager to map each TPVV to a zero LD group different from the most recently used zero LD group.

13. The system of claim 11, wherein the system manager to switch ownership of the affected zero LDs one at a time comprises:
   determine TPVVs mapped to an affected zero LD;
   suspend host IOs the TPVVs mapped to the affected zero LD; and
   flush data from cache to backing store for an old primary node.

14. The system of claim 11, wherein:
   the node further comprising:
      common-provisioned virtual volumes (CPVVs) each mapped to at least one non-zero LD from a common provisioning group, the CPVVs being fully provisioned, the common provisioning group providing a pool of LD regions for creating virtual volumes; and
      when the change of ownership occurs, to switch ownership of the non-zero LDs one common provisioning group at a time so host IO is suspended for one group of the CPVVs at a time.

15. The system of claim 14, wherein to switch ownership of the non-zero LDs comprises:
   to determine non-zero LDs having an old primary node;
   to determine CPVVs mapped to the non-zero LDs having the old primary node;
   to suspend host IO to the CPVVs mapped to the non-zero LDs having the old primary node; and
   to flush data from cache to backing store for the old primary node.

* * * * *